Feb. 4, 1936. O. W. GITHENS 2,029,474
PHOTOGRAPHIC CAMERA
Filed March 7, 1933 2 Sheets-Sheet 1
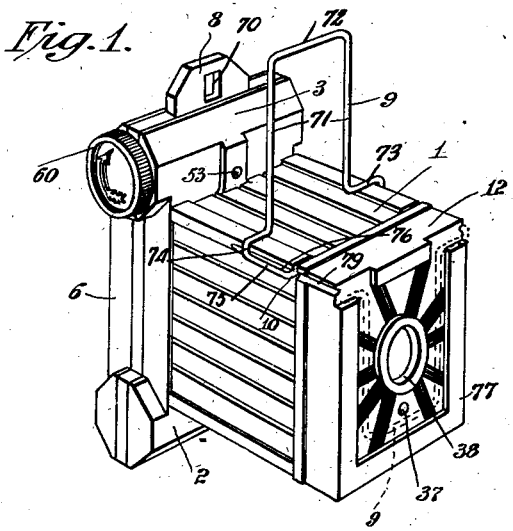
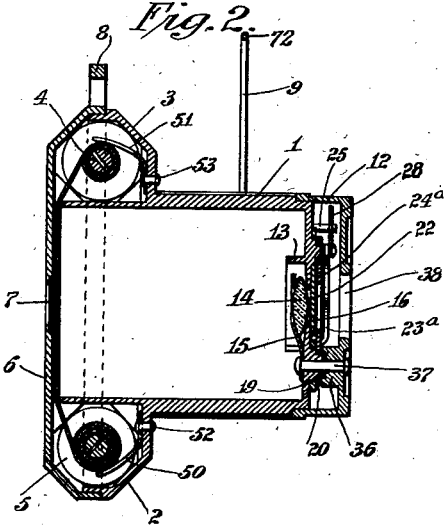
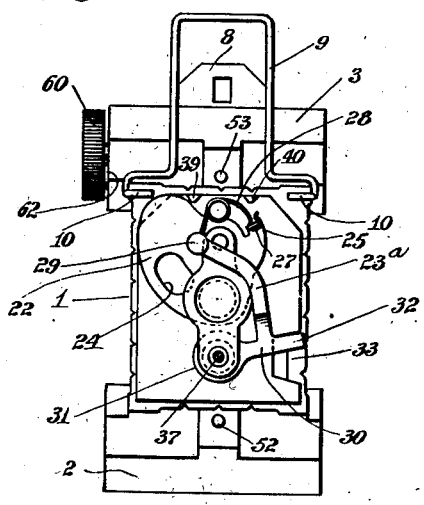
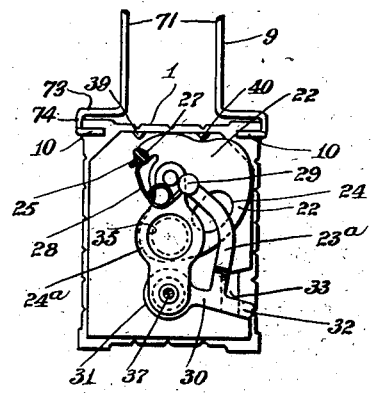
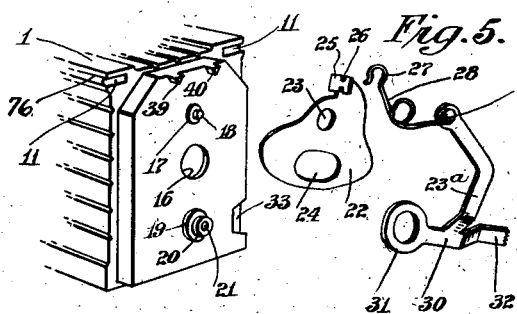
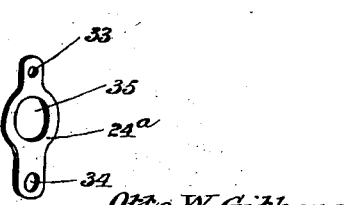
Otto W. Githens
INVENTOR
BY
ATTORNEY

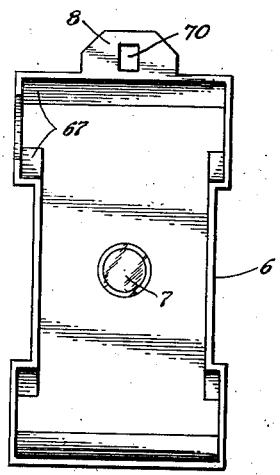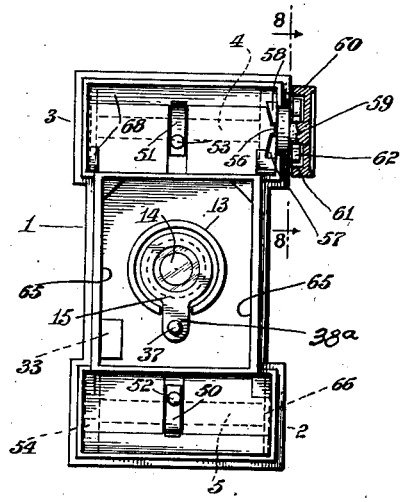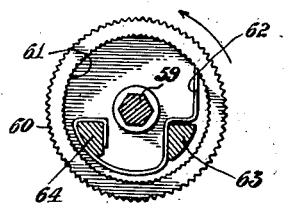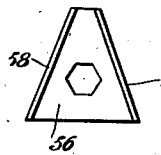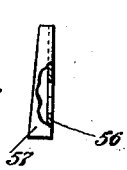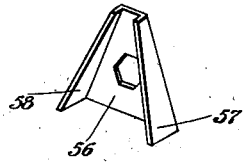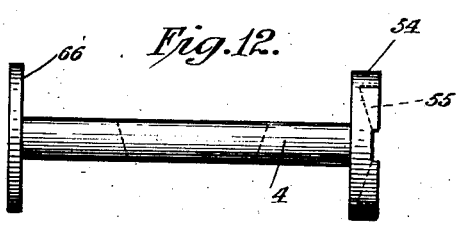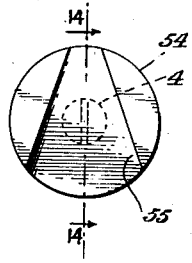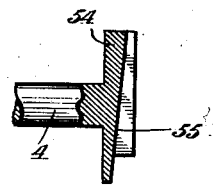

Patented Feb. 4, 1936

2,029,474

UNITED STATES PATENT OFFICE 2,029,474

PHOTOGRAPHIC CAMERA

Otto W. Githens, Indianapolis, Ind., assignor to Universal Camera Corporation, New York, N. Y., a corporation of New York Application March 7, 1933, Serial No. 659,912

21 Claims. (Cl. 242—71)

This invention relates to new and useful improvements in photographic cameras, and particularly cameras of the back loading type.

It is the object of the present invention to provide an inexpensive camera, simple to construct, assemble and operate.

With these objects in view I provide certain new and useful improvements in the shutter mechanism, the construction of the camera casing, the mounting of the shutter mechanism on the camera casing, the film spool and take-up mechanism and other features, the nature of which will more clearly appear from the following detailed description of a preferred embodiment of my camera and the appended claims.

In the drawings, Fig. 1 is a perspective view of the assembled camera;

Fig. 2 is a vertical cross-section;

Fig. 3 is a front view with the shutter cover removed showing the shutter mechanism in one extreme position;

Fig. 4 is a view similar to Fig. 3 with the shutter in another extreme position;

Fig. 5 is a perspective view showing parts of the shutter mechanism and the front end of the camera disassembled;

Fig. 6 is a front elevation of the camera back;

Fig. 7 is a rear view of the assembled camera with the back removed;

Fig. 8 is an enlarged sectional view along lines 8—8 of Fig. 7;

Figs. 9, 10 and 11 are rear and side elevations and a perspective view, respectively, of the film spool take-up mechanism;

Fig. 12 is a side elevation of the film spool;

Fig. 13 is an end view of the spool head; and

Fig. 14 a cross-section along lines 14—14 of Fig. 13.

1 is a casing for the camera preferably made of any suitable molding composition. One end of this casing 1 is formed into chambered body portions 2 and 3 for housing the film spools 4 and 5, and adapted to be enclosed by the back cover 6 held on the housing proper by means of any suitable arrangement. 7 is a colored disc of transparent material held within an aperture of the back. The front wall of the housing 1 has molded therein an inwardly projecting rim 13 within which the lens 14 is held by means of a washer 15 back of an aperture 16 in the front wall of the housing.

Above and below the aperture 16 two pins are molded in the casing serving as the pivot points of the shutter and shutter-operating lever, respectively. The upper pin has a relatively wide base 17 and a top extension 18 of narrower diameter. The lower pin has also a wider base 19 and a narrower top 20, both however are of larger diameters than the corresponding parts of the top pin and they are perforated as indicated at 21. The shutter mechanism proper which is mounted on these two pins consists of a shutter 22, operating lever 23ª, and a combination bridging spring and light baffle 24ª. The part 24 blocks the passage of light to the film except through the apertures 35, 24 and 16.

The shutter is provided with a hole 23 near its center which fits over the base 17 of the upper pin, which acts as the fulcrum of the shutter and it is provided with a wide aperture 24 near one end cooperating with the aperture 16 in the front end of the casing. The upper end of the shutter is bent back at right angles into an arm 25 provided with notches 26 adapted to be engaged by a hooked end 27 of a spring 28. The other end of the spring is hooked around a rivet 29 in the free end of the operating lever 23. The lower end of the lever 23 terminates in an arm 30, one end of which is shaped into a hub 31 which fits over and is adapted to be rotated around the wide base 19 of the lower pin, and the other end of which forms a handle 32 lying within a recess 33 of the front end of casing 1. The central portion of the lever 23 is raised with respect to the arm 30 so as to clear the shutter 22. The upper end of a spring bridge piece 24 is perforated at 33 to fit over the pin 18 and the lower end is perforated at 34 to fit over the pin 20. The bridge spring and the light baffle 24 has a central perforation 35 in alignment with the aperture hole 16 and is so bent that its upper end around the perforation 33 acts as a spring clip bearing on the shutter 22 when the lower end of the bridge 24 is pressed against the upper surface of base 19. The bridge 24 is thus held under tension by means of a ferrule 36 projecting from the inside of the shutter or front cover 12. The shutter cover is seated on the edge of the front wall of the housing and is held in position by means of a rivet 37 projecting through the center of the ferrule 36, the hole 21, through the pins 19 and 20, and through a downwardly projecting arm 38ª of the washer 15. It will be seen, therefore, that the single rivet 37 serves to hold in assembled position the shutter mechanism, shutter or front cover, housing, lens and finder wire. The cover 12 is apertured at 38 in alignment with the lens.

At the top of the housing front wall two stops 39 and 40 are molded which act to limit the extreme positions of the shutter 22. With the shutter in the position shown in Fig. 3, upon pulling down the handle 32, the lever 23ª, through the agency of the spring 28, will flip the shutter 22 from the position shown in Fig. 3 into the position shown in Fig. 4. The film is exposed while the aperture 24 in the shutter passes in front of the aperture 16 and the lens 14. The cover 12 prevents the radiation of light otherwise than through the aperture 38. The next exposure is made by moving the handle 32 upward from the position shown in Fig. 4 into the position shown in Fig. 3.

The film is fed from spool 5 onto spool 4. The film spools are held in position by means of springs 50 and 51 riveted to the chambered body portions 2 and 3 at 52 and 53. The springs 50 and 51 are tensioned to press against the film spools when they are half full, whereby when more than half the supply has been fed from the lower spool 5 onto the upper spool 4, the spring 50 is relieved of tension and the spring 51 is placed under tension. One head 54 of the upper film spool 4 is provided with a wedge-shaped groove 55 having diverging sides. The bottom of the groove is sloping with respect to the horizontal axis of the spool, as clearly indicated in Fig. 14. Within this groove 55 fits a tapered key clearly shown in Figs. 9 to 11. The key consists of sheet metal bent to form a wedge-shaped top 56 and wedge-shaped depending flanges 57 and 58 adapted to engage the diverging sides of the groove 55, the edges of said flanges contacting said bottom. The taper of flanges 57 and 58 is substantially equal to the taper of the groove bottom 55. The key may be turned by means of a shaft 59 suitably held in the top 56, the other end of the shaft forming a unitary part with a metal knob 60 mounted on one side of the chambered body portion 3. The outside circumference of the knob 60 is knurled and its inside surface has ratchet teeth cut in it, as indicated at 61. The toothed portion 61 is engaged by the free end 62 of a ratchet spring fitted on two projections 63 and 64 provided on the body portion 3. As it will be clear from Fig. 8 this construction permits the use of a single suitably bent flat spring 62 as a ratchet. Owing to the engagement between ratchet spring 62 and the serrated hub 61, the knob 60 may be turned only in the direction of the arrow, and when so turned will rotate spool 4 through the agency of key 56 to draw film from the lower spool 5 to the upper spool 4 over the edges 65 of the housing 1, the clearance between the back cover 6 and the rear edges 65 of the housing 1 being just sufficient to permit the passage of the film. The extent to which the film has been advanced may be observed through the colored celluloid or glass disc 7 in the peephole.

The diverging flanges 57 and 58 engaging the diverging sides of the groove 55 permit the upper spool 4 to be withdrawn in a number of positions of the key 56. Thus the key 56 may be in any position between the position where the flange 57 is horizontal, looking at Fig. 7 of the drawings, and that where the flange 58 is horizontal, looking at Fig. 7. Between such positions the spool 4 may be readily withdrawn by merely drawing the spool rearwardly in a direction perpendicular to the rear plane of the camera, the grooved head 54 being enabled to move away from the key 56 in any of the intermediate positions of said key. Due to the slope of the edges of said flanges as soon as the spool is moved away from the key, the head 54 moves out of contact with respect to said edges. In fact, if the key 56 is in any position between the limiting positions and with either the flange 57 or the flange 58 inclined to the rear plane of the camera, looking at Fig. 7 of the drawings, the grooved head 54 will move entirely out of contact with respect to the key as soon as the spool is moved a slight distance. It is only when either the flange 57 or 58 is in its limiting position which permits removal of the spool, that one side surface of the groove 55 will have sliding contact with one of the flanges as the spool is removed. If the groove 55 had parallel walls instead of diverging walls, the spool could not be removed except when the key is in such position that the groove is horizontal, or perpendicular to the rear plane of the casing and slight rotation of the key from such position would prevent removal of the spool.

The heads 54 and 66 of the film spools are seated on the tapered rims 67 provided in the back cover 6 and corresponding tapered rims 68 in the chambered body portions 2 and 3, the back cover 6 having chambered body portions corresponding to the chambered body portions 2 and 3 on the casing 1 and forming therewith housings for the two spools. The back member 6 is formed at the top end thereof with a central upwardly projecting flat wall 8 having a rectangular opening 70 forming a sight. Cooperating with the sight opening 70 is a finder 9 preferably made of a single piece of wire and comprising a pair of parallel vertical portions 71 interconnected at the top by a horizontal portion 72. Extending outwardly from the bottom ends of the portions 71 are portions 73 contacting the top of the camera casing. Extending downwardly from the outer ends of the portion 73 are portions 74 contacting the outer surface of the side wall of the camera. The portions 74 are of relatively small length and extending from the bottom ends thereof are forwardly extending portions 75 contacting the sides of the camera. Extending from the forward ends of the portion 75 are inwardly projecting aligned ends 10. The front face of the front wall of of the camera may be formed adjacent the top end thereof and at the opposite sides thereof with horizontally aligned grooves 11 for receiving the inwardly projecting end portions 10 of the finder. The side walls of the camera may likewise be formed with grooves 76 for receiving the portions 75 of the finder. The portions 10 of the finder 9 are received between the front wall of the casing and the cover 12. When the cover is attached to the camera casing the finder 9 is held in position.

It will now be understood that the finder is swivelled about the portions 10 thereof and may be moved from the full line position shown in Fig. 1 to the dotted line position shown in said figure. In the full line position the portions 73 contact the top of the camera casing and the portions 74 and 75 contact the sides of the camera casing. To focus the camera the person taking the picture looks through the sight opening 70 for properly positioning the camera with respect to the object to be photographed. When the camera is not in use the finder 9 may be swung to the position shown in Fig. 1 of the drawings, with the portions 71, 72, 73 and 74 contacting the front of the cover. The front face of the cover 12 is preferably formed with a raised portion 77 at the bottom and sides and terminating short of the top of the cover forming shoulders or ledges adjacent which lie the portions 72, 71 and 73 of the finder. Thus when the camera is not in use the finder is within the recessed part of the front cover 12 and flush with the raised portion 17. The cover member 12 may furthermore be formed at the side surfaces thereof and adjacent the top side edges thereof with horizontal grooves 19 for receiving the portions 75 of the finder when the finder is in the dotted line position shown in Fig. 1 of the drawings. Obviously the portions 75 of the finder press against the sides of the camera casing in either the position for use or in folded position for retaining the finder against accidental movement.

What I claim is:

1. In a camera, a casing having an aperture, a film in cooperative relation with said aperture, a spool on which the film is wound, a head for said spool having a wedge-shaped groove the bottom of which is sloping with respect to the horizontal axis of the spool, a knob, and means operated by said knob projecting in the groove of said spool head.

2. In a camera, a casing having an aperture, a film in cooperative relation with said aperture, a spool on which the film is wound, a head for said spool having a wedge-shaped groove the bottom of which is sloping with respect to the horizontal axis of the spool, a wedge-shaped key cooperating with said groove, a knob for turning said key, and means for preventing rotation of said knob in one direction.

3. In a camera, a casing having an aperture, a film in cooperative relation with said aperture, a spool on which the film is wound, a head for said spool having a wedge-shaped groove the bottom of which is sloping with respect to the horizontal axis of the spool, a wedge-shaped key cooperating with said groove having sides sloping at substantially the same angle as the bottom of said groove in the spool head, a knob for turning said key, and a spring ratchet engaging said knob.

4. In a camera, a casing formed with a chamber, a film spool rotatable within said chamber, one end of said spool having a head formed with a transverse groove having longitudinally diverging sides, a knob mounted on said casing, and a key operated by said knob projecting into said groove.

5. In a camera, a casing formed with a chamber, a film spool rotatable within said chamber, one end of said spool being provided with a head formed with a groove having diverging sides, a knob mounted on said casing, and a key operated by said knob projecting into said groove, the bottom of said groove being inclined to the axis of said spool.

6. In a camera, a casing having a chamber, a film spool rotatably mounted within said chamber, said spool having a head at one end formed with a groove, a bottom of said groove being in a plane inclined to the axis of said spool, a knob rotatably mounted on said casing and a key operated by said knob and projecting into said groove.

7. A film spool for a camera having a head at one end formed with a transverse groove having longitudinally diverging sides.

8. A film spool for a camera having a head at one end formed with a groove having diverging sides, and the bottom of said groove being in a plane inclined to the axis of said spool.

9. A film spool for a camera having a head at one end formed with a groove, the bottom of said groove being in a plane inclined to the axis of said spool.

10. In a camera, a casing, a film spool rotatably mounted therein and having a head at one end formed with a transverse groove, the bottom end of said groove being in a plane transverse of and inclined to the axis of said spool and the sides of said groove diverging with respect to one another, and a key received within said groove made of sheet metal and having diverging flanges contacting the diverging sides of said groove, said flanges being interconnected by a wall and the outer edges of said flanges being inclined and contacting the bottom of said groove.

11. In a camera, a casing, a film spool rotatably mounted therein and having a head at one end formed with a transverse groove, the bottom of said groove being in a plane transverse of and inclined to the axis of said spool and the sides of said groove diverging with respect to one another, a key received within said groove, made of sheet metal and having diverging flanges contacting the diverging sides of said groove, said flanges being interconnected by a wall and the outer edges of said flanges being inclined and contacting the bottom of said groove, said wall being formed with a non-circular opening, and a knob rotatably mounted on said casing and having a non-circular portion engaging within said opening.

12. In a camera, a casing, a film spool rotatably mounted therein and having a head at one end formed with a transverse groove, the bottom of said groove being in a plane transverse of and inclined to the axis of said spool and the sides of said groove diverging with respect to one another, a key received within said groove made of sheet metal and having diverging flanges contacting the diverging sides of said groove, said flanges being interconnected by a wall and the outer edges of said flanges being inclined and contacting the bottom of said groove, said wall being formed with a non-circular opening, a knob rotatably mounted on said casing and having a non-circular portion engaging within said opening, said knob being formed with ratchet teeth, and a spring mounted on said casing and cooperating with said ratchet teeth to permit rotation of said knob in one direction only.

13. In a camera, a casing, a film spool rotatably mounted therein, a knob rotatably mounted on said casing and formed with a circular flange, the inner surface of said flange being formed with ratchet teeth, and a spring mounted on said casing and received within said circular flange and engaging said ratchet teeth, and means on said knob for engaging said spool.

14. In a camera, a casing, a film spool rotatably mounted therein and having a head at one end formed with a groove, a key received within said groove made of sheet metal and having flanges contacting the sides of said groove, said flanges being interconnected by a wall, said wall being formed with a non-circular opening, and a knob rotatably mounted on said casing and having a non-circular portion engaging within said opening.

15. In a camera, a casing, a film spool rotatably mounted therein and having a head at one end formed with a groove, a key received within said groove made of sheet metal and having flanges contacting the sides of said groove, said flanges being interconnected by a wall, said wall being formed with a non-circular opening, and a knob rotatably mounted on said casing and having a non-circular portion engaging within said opening, and means for permitting rotation of said knob in one direction and preventing rotation of said knob in the opposite direction.

16. In a camera, a casing, a film spool rotatably mounted therein, a member rotatably and non-slidably mounted on said casing and having a handle portion on the exterior of said casing, and a key on the interior of said casing, said film spool having a head at one end provided with a groove receiving said key, said groove having diverging sides and said key likewise having diverging sides contacting the sides of said groove.

17. In a camera, a casing, a film spool rotatably mounted therein, a member rotatably and non-slidably mounted on said casing and having a handle portion on the exterior of said casing a key on the interior of said casing, said film spool having a head at one end provided with a groove receiving said key, said groove having diverging sides and said key likewise having diverging sides contacting the sides of said groove, and the bottom surface of said groove being in a plane inclined to the axis of said spool and said key having a portion contacting said bottom surface.

18. In a camera, a casing having a chamber, a film spool within said chamber, having a head at one end formed with a transverse groove having longitudinally diverging sides, and a key on said casing projecting into said groove and having diverging sides engaging the diverging sides of said groove.

19. A camera comprising casing means forming a spool receiving chamber, a winding knob rotatably mounted on and accessible from the exterior of said casing means, said knob including an annular part having teeth formed on its inner periphery, and a spring pawl mounted on said casing means within said annular part and having an end engaging said teeth to prevent rotation of said knob in one direction.

20. A camera comprising a casing, a film spool winding knob rotatably mounted on said casing, said knob including an annular part having teeth formed on its inner periphery, two lugs projecting from said casing into the space within said annular part, and a resilient strip of metal having one end partially encircling one of said lugs to be held in place thereby and its other end engaging said teeth to prevent rotation of said knob in one direction, said strip having intermediate its ends an angularly bent part lying against the other of said lugs and held thereby against displacement in one direction.

21. A camera comprising a casing open at the rear, a rear cover for said casing, said casing and cover forming film spool receiving chambers and including non-removable portions for supporting film spools, film spools rotatably mounted within said chambers, said casing having at the rear edge thereof an ear formed with a bearing opening, and a member rotatably and non-slidably fixed within said bearing opening and being non-removable with respect to said casing and having a key removably engaging one of said spools for turning the same.

OTTO W. GITHENS.